(12) United States Patent
Dragic

(10) Patent No.: US 7,840,110 B1
(45) Date of Patent: Nov. 23, 2010

(54) OPTICAL WAVEGUIDE

(76) Inventor: Peter Danny Dragic, 1307 Bluegrass Ln., Champaign, IL (US) 61822

( * ) Notice: Subject to any disclaimer, the term of this patent is extended or adjusted under 35 U.S.C. 154(b) by 0 days.

(21) Appl. No.: 11/863,247

(22) Filed: Sep. 27, 2007

Related U.S. Application Data

(60) Provisional application No. 60/847,473, filed on Sep. 27, 2006.

(51) Int. Cl.
*G02B 6/02* (2006.01)
(52) U.S. Cl. .................................. 385/123; 385/141
(58) Field of Classification Search .................. None
See application file for complete search history.

(56) References Cited

U.S. PATENT DOCUMENTS

| | | | |
|---|---|---|---|
| 6,542,683 B1 | 4/2003 | Evans | |
| 6,587,623 B1 * | 7/2003 | Papen et al. | 385/123 |
| 6,687,440 B2 | 2/2004 | Balestra | |
| 6,856,740 B2 | 2/2005 | Balestra | |
| 7,079,749 B2 * | 7/2006 | Dragic | 385/142 |
| 7,130,514 B1 * | 10/2006 | Chen et al. | 385/123 |
| 7,209,626 B2 * | 4/2007 | Dragic | 385/142 |
| 7,440,665 B2 * | 10/2008 | Hasegawa | 385/127 |
| 7,522,788 B2 * | 4/2009 | Akahoshi et al. | 385/14 |
| 7,627,219 B2 | 12/2009 | DiGiovanni et al. | |
| 2004/0096170 A1 * | 5/2004 | Papen et al. | 385/123 |
| 2005/0013569 A1 * | 1/2005 | Dragic | 385/123 |
| 2005/0244121 A1 * | 11/2005 | Dragic | 385/127 |
| 2006/0171648 A1 * | 8/2006 | Hasegawa | 385/127 |
| 2007/0116416 A1 * | 5/2007 | Chen et al. | 385/123 |
| 2007/0196063 A1 * | 8/2007 | Dragic | 385/126 |
| 2008/0008432 A1 * | 1/2008 | Dragic | 385/127 |

OTHER PUBLICATIONS

Dragic, P., et al. "Optical fiber with an acoustic guiding layer for stimulated Brillouin scattering suppression." May 22, 2005, Proceedings of CLEO 2005: Conference on Lasers and Electro-Optics, vol. 3; pp. 1984-1986.*

Dragic, Peter. "Suppression of first order stimulated Raman scattering in erbium-doped fiber laser based LIDAR transmitters through induced bending loss." 2005. Optics Communications 250, pp. 403-410.*

Koyamada et al., Simulating and Designing Brillouin Gain Spectrum in Single-Mode Fibers, J. of Lightwave Technology, 2004, vol. 22, pp. 631-639.*

Ohashi and Tateda, "Design of a Strain-Free-Fiber with Nonuniform Dopant Concentration for Stimulated Brillouin Scattering Suppression," IEEE Journal of Lightwave Technology, vol. 11, No. 12, pp. 1941-1945, Dec. 1993.

(Continued)

*Primary Examiner*—Charlie Peng
*Assistant Examiner*—Peter Radkowski
(74) *Attorney, Agent, or Firm*—Carmen Patti Law Group, II

(57) ABSTRACT

An optical waveguide fiber having a high threshold for stimulated Brillouin scattering (SBS). The SBS threshold is increased by an acoustically antiguiding configuration of the fiber. An acoustic configuration comprises one or more acoustic regions having acoustic velocities decreasing from the centerline of the fiber. More preferable configurations have acoustic regions with smaller radial thickness and smaller differences in acoustic velocities among regions.

14 Claims, 14 Drawing Sheets

OTHER PUBLICATIONS

Shiraki, Ohashi, Tateda, "Suppression of Stimulated Brillouin Scattering in a Fibre by Changing the Core Radius," Electronics Letters, vol. 31, No. 8, pp. 668-669, Apr. 13, 1995.

Eskildsen, Hansen, Koren, Miller, Young, Dreyer, "Stimulated Brillouin scattering suppression with low residual AM using a novel temperature wavelength-dithered DFB laser diode," Electronics Letter, vol. 32, No. 15, pp. 1387-1389, Jul. 18, 1996.

Smith, "Optical Power Handling Capacity of Low Loss Optical Fibers as Determined by Stimulated Raman and Brillouin Scattering," Applied Optics, vol. 11, No. 11, pp. 2489-2494, Nov. 1972.

Takushima, Okoshi, "Suppression of Simulated Brillouin Scattering Using Optical Isolators," Electronics Letters, vol. 28, No. 12, pp. 1155-1157, Jun. 4, 1992.

* cited by examiner

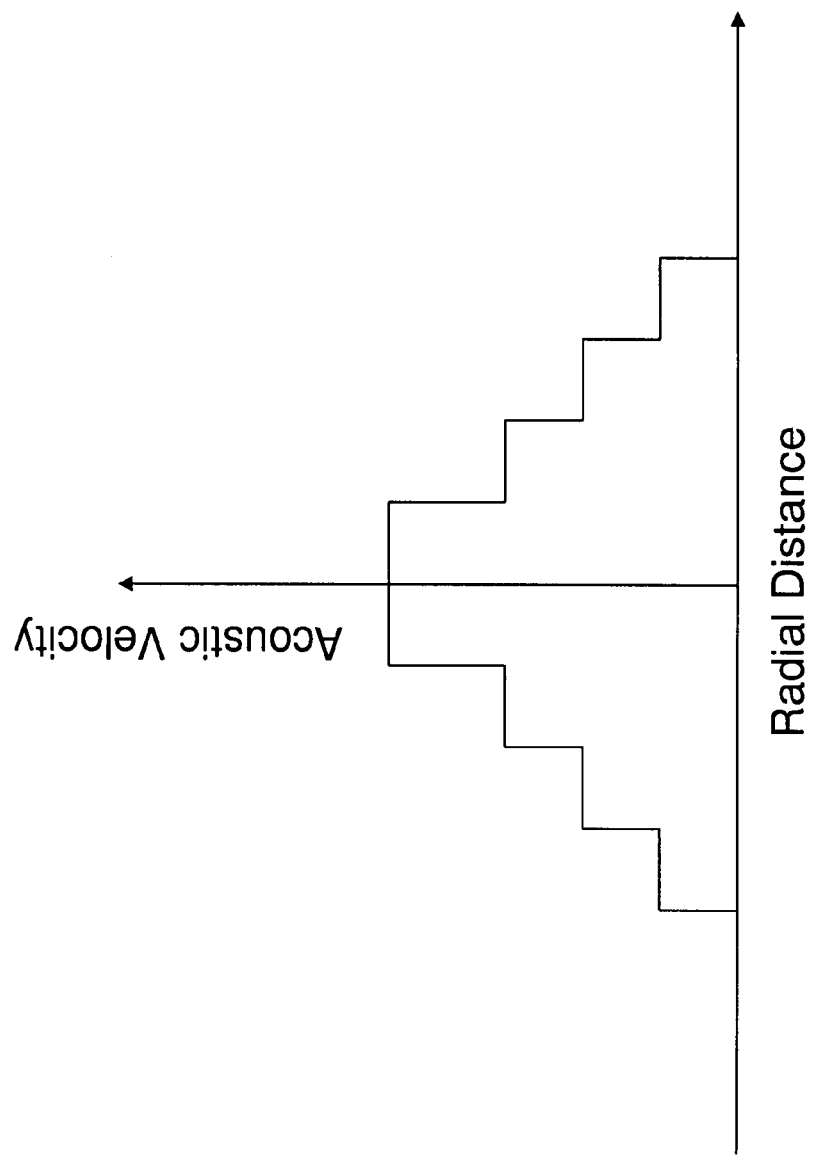

OPTICAL WAVEGUIDE

This application claims the benefit of Provisional application No. 60/847,473, filed Sep. 27, 2006.

BACKGROUND

1. Field of the Invention

The disclosed mechanism relates in general to a waveguide configuration, and more particularly, to a waveguide configuration which is particularly well suited for the suppression of SBS due to an interaction of acoustic waves with optical signals.

2. Technical Background

The use of waveguides in various industries such as telecommunications and lasers, among others, has been steadily increasing. While the ability to send optical signals through waveguides is well known in the art, certain deleterious phenomena have been observed. In particular, one generally undesirable effect that has been observed is the Stimulated Brillouin Scattering (SBS) effect. SBS is one of the major limiting factors on the amount of power that can be transmitted via an optical fiber.

SBS is an interaction of optical energy with acoustic energy. Optical energy guided into optical waveguides, e.g., the core of an optical fiber, produces acoustic energy. As is known in the art, once a certain amount of optical power is directed into a waveguide from another optical source or generated in the waveguide, the effect of SBS causes optical energy to backscatter into the source. This phenomenon has become relevant in the optical fiber industry, due to the increasing intensity required in optical fiber cores and the relatively long interaction lengths.

Some attempts to suppress the SBS effect relied on waveguides with particular constructions. While some of the solutions have suppressed the SBS effect to some extent, many of these waveguides have constructions which are difficult to manufacture on a large scale, or which are economically not feasible.

U.S. Pat. No. 6,856,740 and U.S. Pat. No. 6,687,440 disclose the use of acoustic field antiguiding to reduce SBS. This is achieved by an optical fiber core that is doped such that the longitudinal acoustic velocity of the fiber core is higher than that of the cladding. However, our analysis showed that this technique will have limited utility because in certain circumstances the acoustic wave in a typical acoustically antiguiding fiber can be guided in the core.

U.S. Pat. No. 7,130,514 discloses a fiber configuration with mode field diameter greater than 12 micrometers and delta % difference between the peak core delta and the cladding of less than 0.3%. The acoustic profile having at least two adjacent regions with acoustic field velocities differing by at least 0.2%. According to its written description, this invention deals with acoustic cladding modes that are prevalent in the absence of core modes. The acoustic cladding modes couple into the core, creating SBS and establishing the SBS threshold.

SUMMARY

The present invention is directed to an optical fiber configuration that has a high SBS threshold therefore allowing for more powerful light sources and conduits. The optical fiber comprises an acoustic core and an acoustic cladding configured in such a way as to increase the losses of the acoustic wave. According to some embodiments of the present invention, the acoustic core has an acoustic profile with generally decreasing acoustic velocities as the distance from the centerline increases. Some of the more preferred embodiments have an acoustic profile comprising regions with radial thickness of less than three times the operating optical wavelength and acoustic velocities of adjacent core acoustic regions that do not differ by more than 0.2%.

These and other features, aspects, and advantages of the present invention will become better understood with reference to the following description and appended claims.

BRIEF DESCRIPTION OF SEVERAL VIEWS OF THE DRAWING

These and other features, aspects, and advantages of the present invention will become better understood with regard to the following description, appended claims, and accompanying drawings where:

FIG. 2b of the drawings illustrates a plot of acoustic fields of the optical fiber corresponding to FIG. 2a;

FIG. 3b of the drawings illustrates a plot of optical and acoustic fields of the optical fiber corresponding to FIG. 3a;

FIG. 4a of the drawings is a schematic cross-sectional representation of the acoustic velocity of an exemplary fiber of the present invention that has four core acoustic regions;

FIG. 7 of the drawings is a schematic cross-sectional representation of the acoustic velocity of an exemplary fiber of the present invention that has two core acoustic regions, while

DESCRIPTION

The present invention now will be described more fully hereinafter with reference to the accompanying drawings, in which preferred embodiments are shown. This invention may, however, be embodied in many different forms and should not be construed as limited to the embodiments set forth herein. In addition, it will be understood that the drawings are merely schematic representations, and some of the components may have been distorted from actual scale for purposes of pictorial clarity.

Optical power levels that exceed the threshold optical power will cause SBS to rapidly rise until SBS limits the power that can be transmitted through the optical fiber. It is well known in the art that the threshold optical power that causes SBS can be expressed by the following equation:

$$P_{th} \sim \frac{A_{eff}\gamma}{L_{eff}g_B\Gamma} \quad (1)$$

where the parameter $A_{eff}$ represents the effective area of the optical mode, the parameter $\Gamma$ represents the overlap integral, the parameter $L_{eff}$ represents the effective fiber length, the parameter $g_B$ represents the Brillouin gain coefficient, and the parameter $\gamma$ represents the overall acoustic loss coefficient. The total acoustic loss coefficient can be expressed as a sum of the material loss coefficient, also known as material damping coefficient, and the waveguide loss coefficient. The relation can be expressed by the following equation:

$$\gamma = \gamma_{wg} + \gamma_{mat} \quad (2)$$

where the parameter $\gamma_{wg}$ represents the waveguide loss coefficient, and the parameter $\gamma_{mat}$ represents the material loss coefficient.

The acoustic "material damping" or "material loss" is the acoustic loss caused by the absorption of acoustic energy by the medium. The material loss is usually expressed in units of inverse meters. For example, the acoustic material loss coefficient for silica optical fibers is approximately $1.85 \times 10^4$ $m^{-1}$ measured at acoustic frequencies associated with optical wavelengths near 1.55 µm.

The acoustic "waveguide loss" is the acoustic loss caused by the configuration of the acoustic profile. For example, acoustically antiguiding fibers typically have higher acoustic waveguide loss coefficients than acoustically guiding fibers.

The optical wavelength refers to the optical wavelength in the vacuum, unless specified otherwise.

The mode field diameter (MFD) is measured using the Peterman II method wherein, 2w=MFD, and $w^2=(2\int f^2(r)rdr/\int[df(r)/dr]^2rdr)$, the integral limits being 0 to ∞.

According to the equation for the SBS threshold optical power, the SBS threshold is linearly proportional to the total acoustic loss coefficient. As a result, in more preferred embodiments of this invention, the acoustic waveguide loss coefficient of the optical fiber is at least equal to the material loss coefficient, approximately doubling the SBS threshold.

Figure 1A:
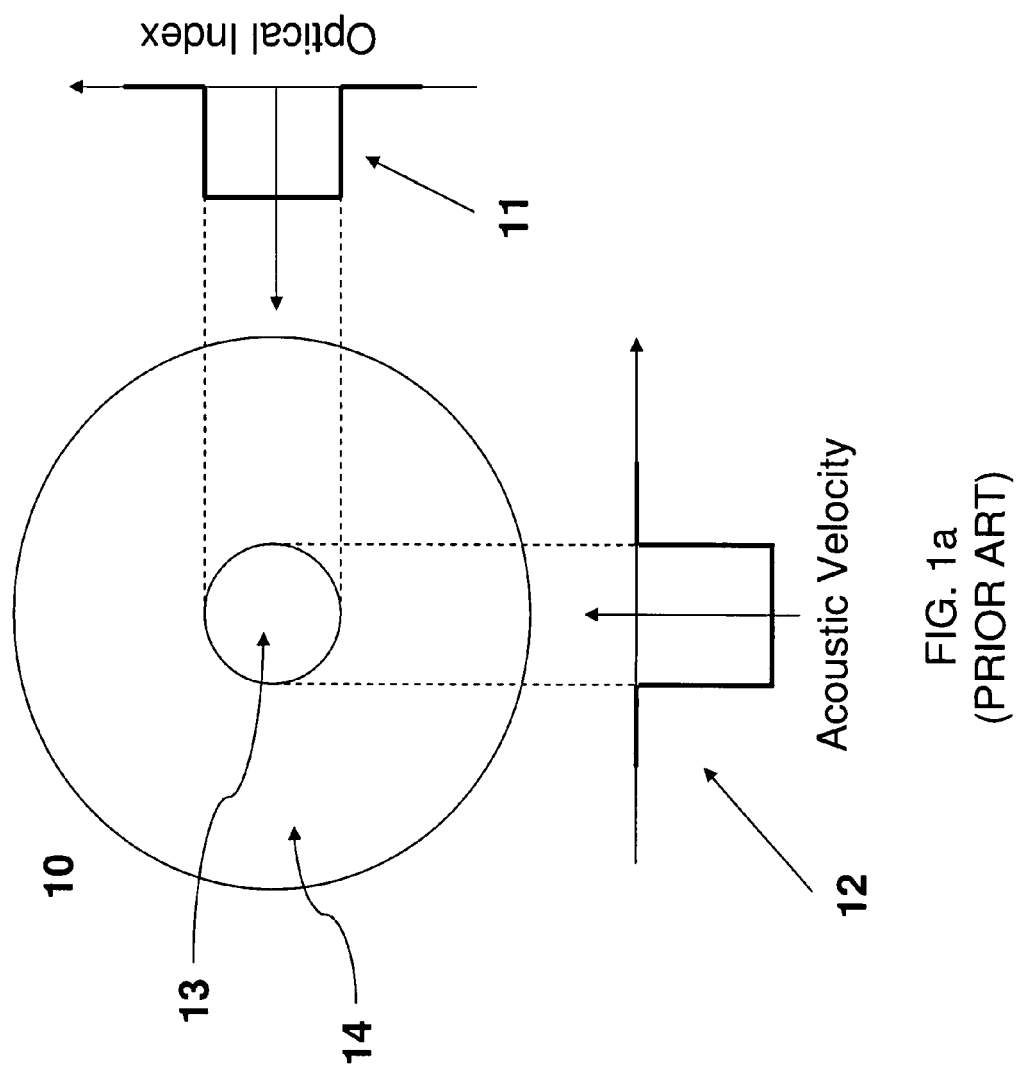
FIG. 1a of the drawings is a schematic cross-sectional representation of a typical acoustically guiding optical fiber.

FIG. 1a shows the optical 11 and acoustic profiles 12 of a typical optical fiber 10 with low SBS threshold value. The optical core 13 is usually constructed by doping the core area with Ge, resulting in an increased optical index of refraction in the core 13 relative to the cladding 14 and decreased acoustic velocity in the core 13 relative to the cladding 14. As a result, this fiber configuration is an effective optical and acoustic waveguide. Because of the guiding nature of the fiber, the acoustic waveguide loss $\gamma_w$ is negligible and the SBS threshold is primarily influenced by the material damping loss $\gamma_{mat}$. In addition, the acoustic energy is well-confined in the core and interacts very strongly with the optical mode. This increased interaction, represented by the overlap integral $\Gamma$, results in a low SBS threshold.

Figure 1B:
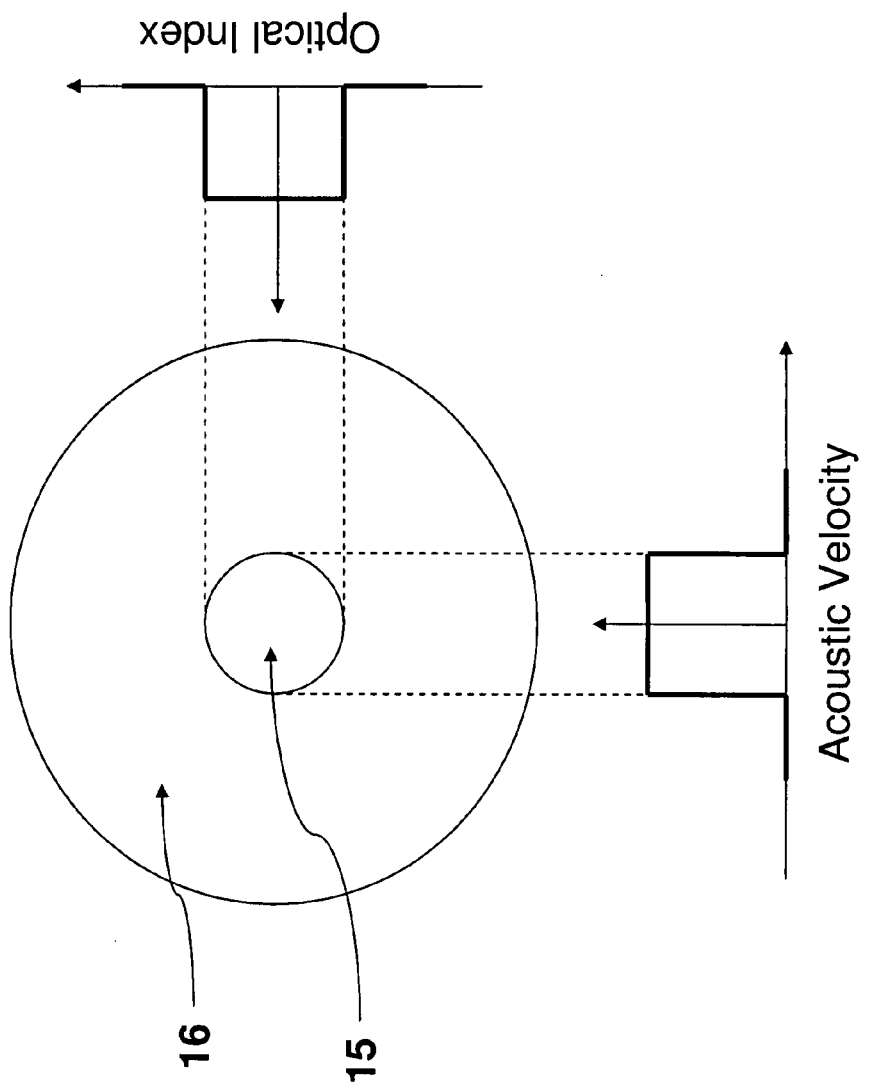
FIG. 1b of the drawings is a schematic cross-sectional representation of a typical acoustically antiguiding optical fiber.

FIG. 1b shows the optical and acoustic profiles of a typical optical fiber that is considered in the industry to be sufficiently acoustically antiguiding for the purposes of SBS suppression. Typically, such fiber has the optical core 15 heavily doped with aluminum (Al) to achieve the increase in both optical index of refraction and acoustic velocity relative to the cladding 16. As a result of Al doping, the acoustic velocity difference between the core and cladding is usually very high. Furthermore, the acoustic core diameter typically matches the optical core diameter, which is typically greater than 5 µm for most fiber applications. However, the resulting acoustic waveguide loss coefficient $\gamma_{wg}$ of the fiber is generally much smaller than the material damping coefficient $\gamma_{mat}$ and, as a consequence, this antiguiding configuration fails to effectively increase the SBS threshold.

Figure 2A:
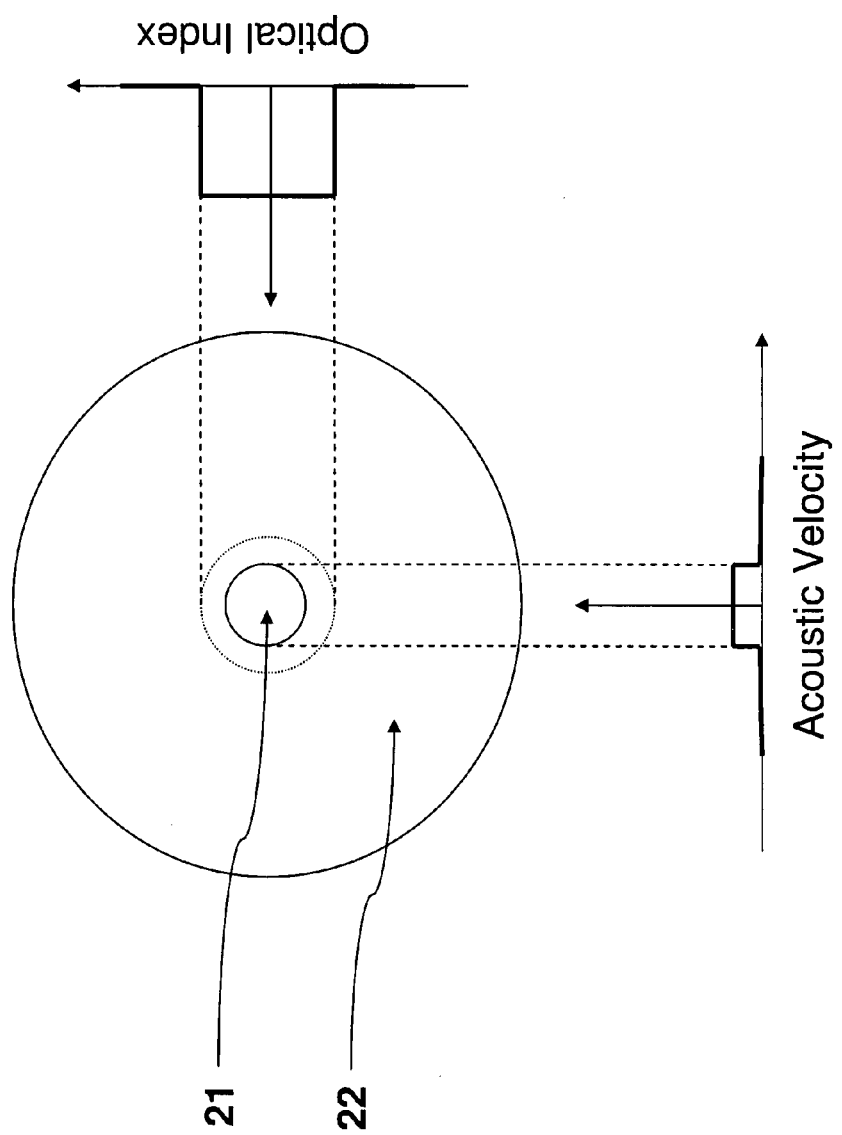
FIG. 2a of the drawings is a schematic cross-sectional representation of an exemplary fiber of the present invention.

FIG. 2a shows one embodiment of the present invention. This fiber configuration has sufficiently large total acoustic loss $\gamma$ to substantially affect the SBS threshold. The total acoustic loss $\gamma$ is increased through an increase in the acoustic waveguide loss $\gamma_{wg}$. The increase in acoustic waveguide loss $\gamma_{wg}$ generally results from two features of the acoustic profile. The first feature comprises a small difference in acoustic velocities between adjacent acoustic regions; in this example, acoustic core 21 and acoustic cladding 22. The acoustic velocity of the core generally decreases as the distance from the centerline increases, giving the acoustic profile its antiguiding nature. The second feature is the small radial thickness of acoustic regions; in this example, it is a small acoustic core diameter.

It will be understood to those skilled in the art that a desired acoustic profile can be designed independently of the optical profile, subject to potential limitations inherent to different manufacturing processes and doping materials. For example, it is well known in the art that Al increases both the acoustic velocity and the optical index of refraction. F and B are known to decrease both the acoustic velocity and index of refraction, and Ge and P are known to decrease the acoustic velocity while increasing the index of refraction. As a result of the degrees of freedom provided by these typical dopants used in the manufacture of fiber, an optical profile can largely be designed independently of the desired acoustic profile.

Figure 2B:
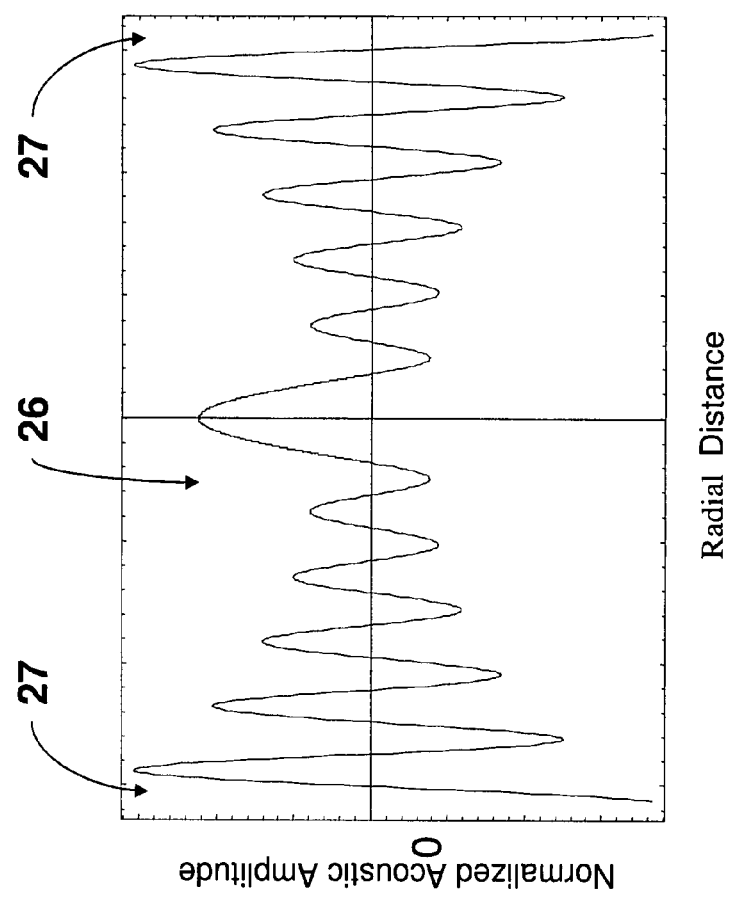

FIG. 2b shows the normalized acoustic amplitude for the acoustic profile configuration shown in FIG. 2a. The drawing is merely a schematic representation, and has been distorted from actual scale for purposes of pictorial clarity. The acoustic mode in the central area 26 has generally lower amplitude than surrounding regions 27, representing a shift of acoustic energy away from the center of the fiber to the cladding. In other words, the acoustic energy effectively radiates from the acoustic core region into the acoustic cladding. This effect is partly due to a small velocity difference between the acoustic core 21 and cladding 22, which provides an efficient coupling for the core acoustic energy traversing to the cladding. In addition, the small acoustic core diameter allows the acoustic energy to quickly escape from the core.

For clarity purposes, FIG. 2b does not show any cladding damping of the acoustic energy that escapes from the acoustic core. FIG. 2b is an idealized representation of an infinite cladding where the acoustic energy radiates from the center without loss. In practice, it may be expected that the cladding material heavily damps radiated acoustic energy. As a consequence, the envelope of the acoustic amplitude does not continue to increase monotonically, as depicted in FIG. 2b, but rather decays as the distance from the acoustic core 21 increases. For all practical purposes, the cladding diameter can be approximated as infinite because the outer boundary of the cladding is considered to have little influence on the acoustic wave in the core. A significant part of radiated acoustic energy is usually lost before it reaches the outer boundary of the cladding due to the heavy material damping loss and typically large fiber cladding diameters (>125 µm). Furthermore, in addition to the increased acoustic loss through the increase in acoustic waveguide loss, reducing the amount of acoustic energy in the core also leads to a decreased overlap integral, thereby promoting the increase in SBS threshold.

As discussed above, the SBS threshold is linearly proportional to the total acoustic loss coefficient γ, where the total acoustic loss coefficient γ in the fiber is the sum of the material damping coefficient $\gamma_{mat}$ and waveguide loss coefficient $\gamma_{wg}$. As a result, more preferable embodiments comprise an optical fiber with the waveguide loss coefficient $\gamma_{wg}$ comparable to the material loss coefficient $\gamma_{ma}$, therefore doubling the SBS threshold. Increased waveguide loss $\gamma_{wg}$ may be achieved through narrower acoustic regions with small differences in acoustic velocities, with values of acoustic velocities generally decreasing by distance from the centerline. According to one embodiment of the present invention having two times the SBS threshold value of comparable typical fiber at optical wavelengths of approximately 1.5 µm, and with optical and acoustic core diameters of 5 µm, the difference between the acoustic core velocity (VCORE) and acoustic cladding velocity (VCLAD) should preferably be less than 40 m/s.

Our analysis also indicates that smaller acoustic core diameters allow for larger acoustic velocity differences VCORE–VCLAD to achieve comparable increases in the SBS threshold. According to one embodiment, for an acoustic core diameter of 4 µm the acoustic velocity difference VCORE–VCLAD should preferably be less than 100 m/s for the same operating wavelength of 1.55 µm.

Furthermore, our analysis indicates that the value of operating optical wavelengths should be taken into consideration when determining the preferred acoustic profile, more specifically, the radial thickness of acoustic regions and the difference in acoustic velocities between acoustic regions. It is well known in the art that the acoustic material loss $\gamma_{mat}$ is inversely proportional to the square of the applied optical wavelength. Consequently, the acoustic modes resulting from shorter optical wavelengths are subject to increased acoustic material loss $\gamma_{mat}$. Therefore, in order to materially increase the SBS threshold for shorter optical wavelengths, the preferred acoustic waveguide loss $\gamma_{wg}$ must have an even greater value.

Furthermore, our analysis indicates that, for shorter wavelengths, the waveguide appears larger to the acoustic mode, thereby further diminishing waveguide acoustic losses inherent in the smaller radial thickness of acoustic regions.

Our research results indicate that for a simple one-layered acoustic core structure, a rule of thumb for achieving an optical fiber with adequate acoustic waveguide loss to materially influence the SBS threshold can be expressed by the following equation:

$$\Delta V < \left(\frac{\lambda}{R}\right)^2 \times 150 m/s \tag{3}$$

where ΔV represents the acoustic velocity difference between the core and cladding (VCORE–VCLAD), λ represents the vacuum operating optical wavelength, and R represents the radius of the fiber acoustic core. In other words, the value of the core radius in micrometers divided by the optical wavelength in micrometers, squared, multiplied by the acoustic velocity difference should remain less than 150 m/s.

Figure 3A:
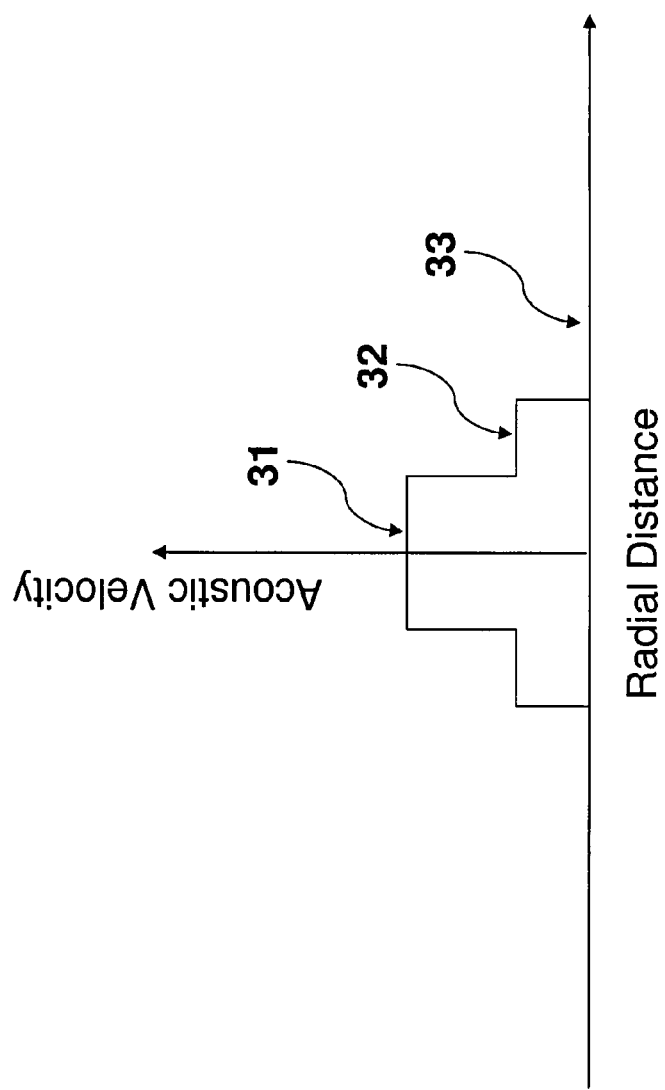
FIG. 3a of the drawings is a schematic cross-sectional representation of the acoustic velocity of an exemplary fiber of the present invention that has two core acoustic regions.

As shown in FIG. 3a. and FIG. 4a, some embodiments of the present invention may have an acoustic core comprising two or more acoustic regions. These configurations may be more preferable for larger acoustic core diameters that would require very small differences in acoustic velocities between the acoustic core and cladding in order to achieve certain increases in the SBS threshold. For example, optical fibers with equally wide optical and acoustic cores of 5 µm or more in diameter, may require a difference in acoustic core and cladding velocities in the range of 1 m/s, which falls well outside current tolerances for typical manufacturing methods and techniques. This manufacturing limitation can be avoided by dividing the acoustic core into two or more acoustic regions with larger differences in acoustic velocity.

Furthermore, even optical fibers with acoustic regions having relatively large acoustic velocity differences, and therefore easily manufactured optical fibers, may benefit from the introduction of multiple acoustic core regions. However, the present invention is not limited to any number of acoustic regions, and the radial thickness of the regions and acoustic velocity may vary. According to one embodiment, an optical fiber with a single-region acoustic core, as shown in FIG. 2a, having acoustic and optical cores with 5 µm diameter and approximately VCORE–VCLAD=40 m/s, would have an SBS threshold increased by approximately 25% for an operating wavelength of around 1.1 µm when compared with traditional fiber. A more preferred embodiment would have a two-step acoustic profile as shown in FIG. 3a. The acoustic core comprises two regions of different acoustic velocities, the central core region 31 having an acoustic velocity of 40 m/s above VCLAD, and the outer core region 32 having an acoustic velocity of 20 m/s above that of the cladding 33. Nevertheless, assuming equal radial thickness for the central and outer core regions, our analysis indicates an increase in the acoustic waveguide loss to approximately 78% of that of the material loss. In a more preferred embodiment, the outer core region 32 may have an even lower acoustic velocity, for example 10m/s above VCLAD. Our analysis indicates that the waveguide loss would be approximately 163% of the material loss. Even more preferably, the acoustic velocity of the outer acoustic core region 32 may be equivalent to the cladding acoustic velocity, VCLAD. For this configuration, our results indicate an increase of the waveguide loss to 180% of the material loss. In fact, this acoustic waveguide configuration acquires a narrow single-layered acoustic core as shown in FIG. 2a, confirming our results that smaller core diameters for a constant acoustic velocity difference VCORE–VCLAD result in increased acoustic waveguide loss.

Figure 3B:
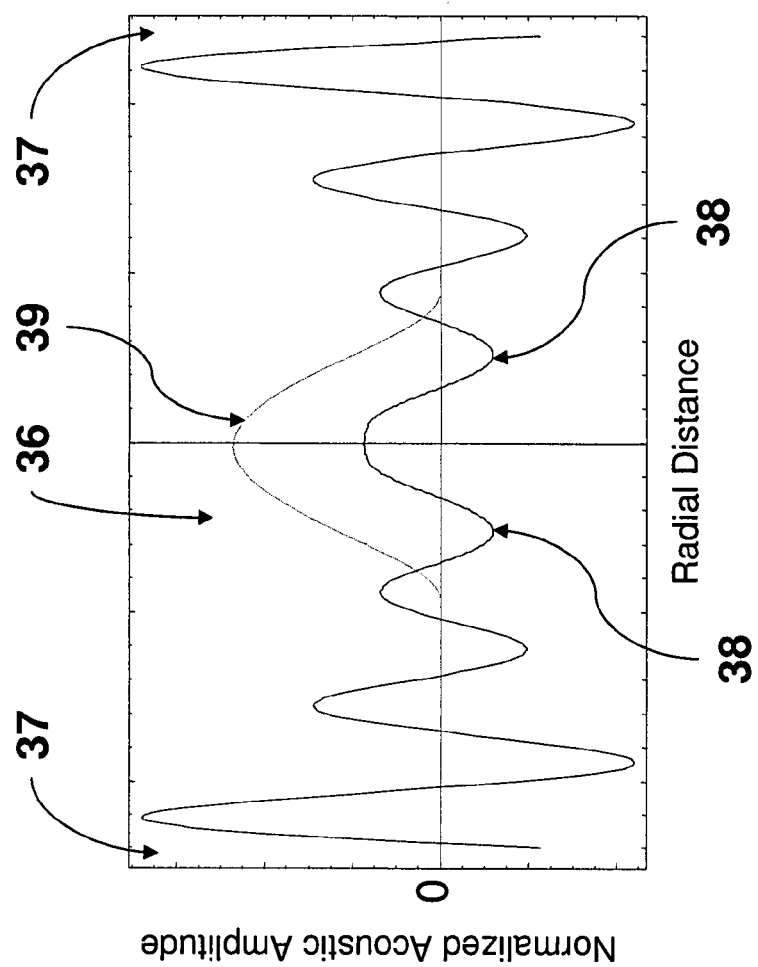
Figure 3C:
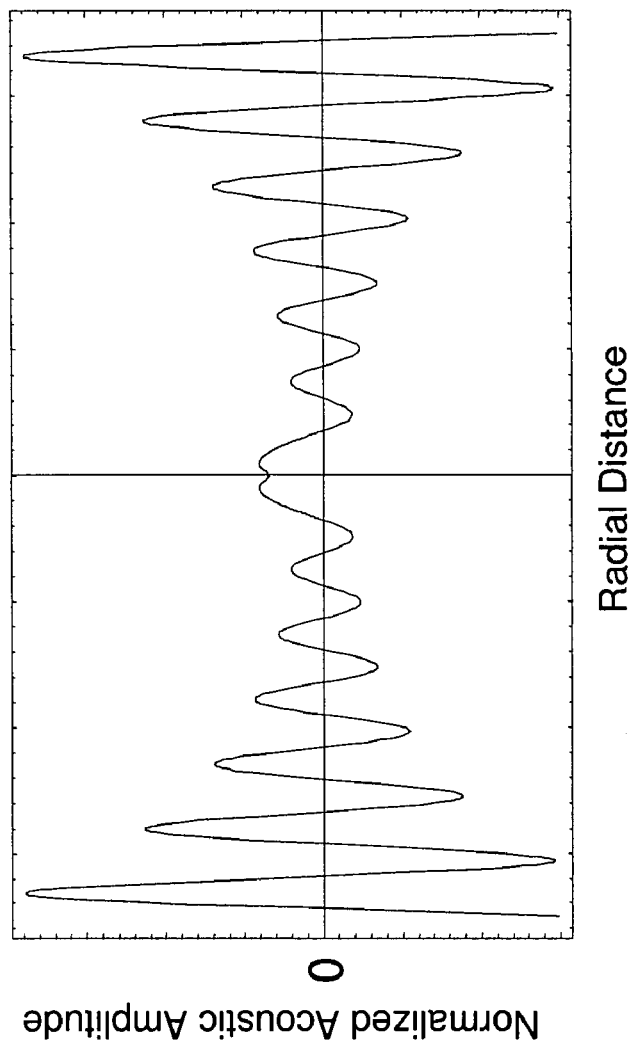

FIGS. 3b shows a primary acoustic mode for an optical fiber with the acoustic profile having two acoustic regions within the acoustic core, similar to acoustic profile shown in FIG. 3a. FIG. 3b is merely a schematic representation, and has been distorted from actual scale for purposes of pictorial clarity. The acoustic mode in the central area 36 has lower amplitude than the surrounding regions 37, representing a radiation of acoustic energy from the center of the fiber. Efficient radiation is due to improved acoustic coupling between acoustic regions, provided by small radial thicknesses of acoustic regions and their small differences in acoustic velocities. Aside from improved acoustic waveguide loss $\gamma_{wg}$, the SBS threshold is further increased by a lowered overlap integral F. In addition to a decreased acoustic amplitude, the existence of negative acoustic amplitude regions 38 relative to the optical mode 39 further decreases the total overlap integral F.

FIG. 4a shows the acoustic profile of one embodiment of the present invention more suitable for larger optical core diameters. The acoustic core comprises a number of acoustic regions primarily increasing acoustic waveguide loss and consequently increasing the SBS threshold.

Figure 4B:
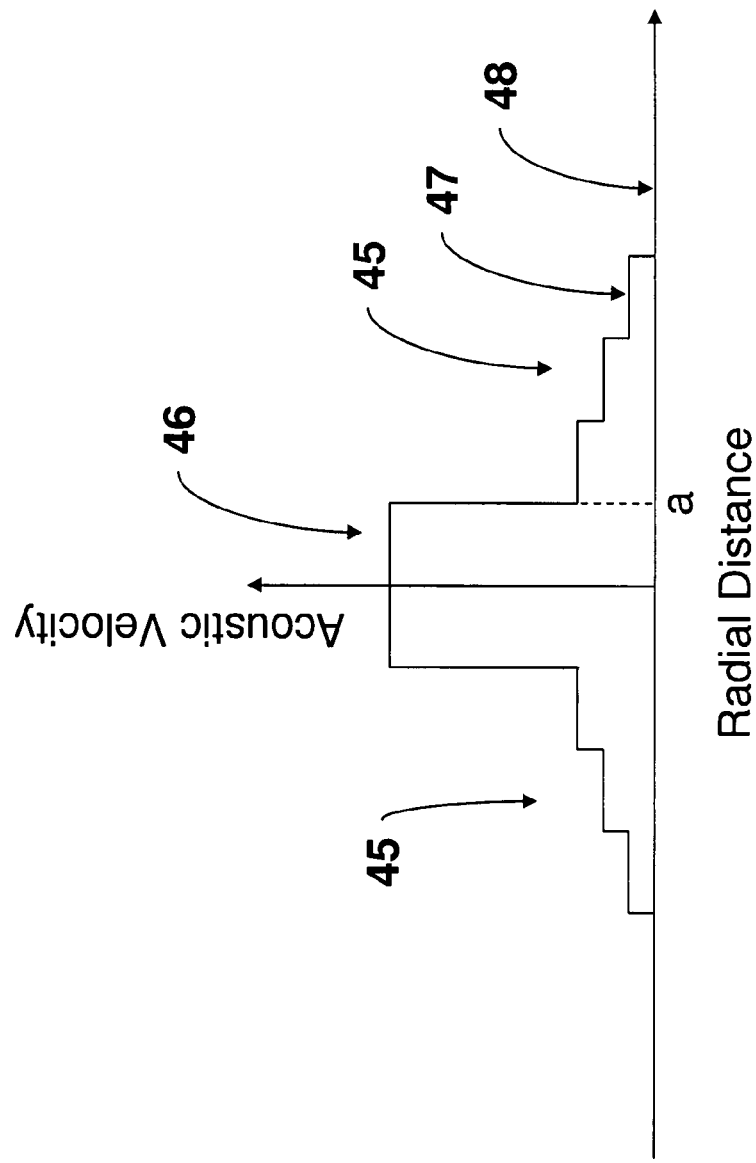
FIG. 4b of the drawings is a schematic cross-sectional representation of the acoustic velocity of an exemplary fiber of the present invention that has four core acoustic regions.

FIG. 4b shows another embodiment of the present invention that may be more suitable for fibers with smaller mode field diameters (MFD), for example less than 12 μm. The acoustic core has a number of acoustic core regions with the outer regions 45 having acoustic velocities close to that of the cladding layer, and the central region 46 having relatively a larger value of acoustic velocity. This waveguide configuration resembles a waveguide comprising a single central region having radius a. Because of the smaller effective acoustic diameter, a somewhat larger acoustic velocity difference between the central and outer layers is more acceptable. The small velocity differences among the outer acoustic regions, and between the outer region 47 and the acoustic core 48, still sufficiently provide for efficient coupling between the acoustic regions and therefore radiation of acoustic energy to the cladding.

Figure 5C:
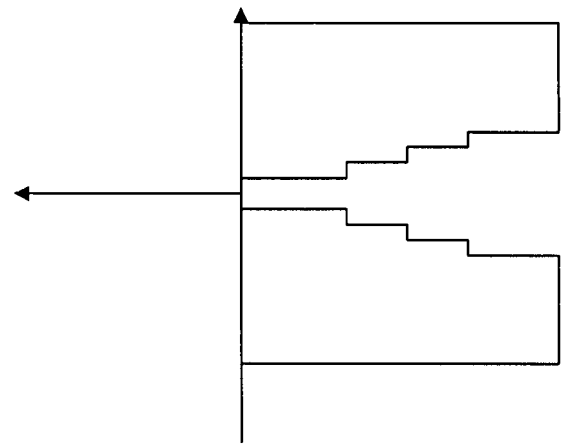
FIG. 5c of the drawings is a schematic cross-sectional representation of the acoustic velocity of an exemplary fiber of the present invention that has more than one cladding acoustic region.
Figure 5B:
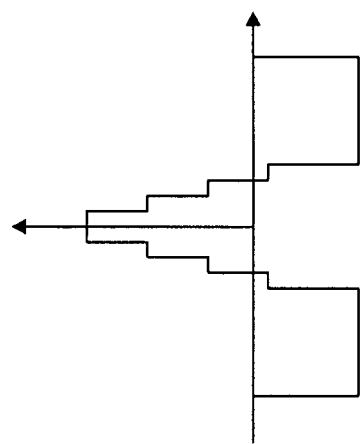
FIG. 5b of the drawings is a schematic cross-sectional representation of the acoustic velocity of an exemplary fiber of the present invention that has more than one cladding acoustic region.
Figure 5A:
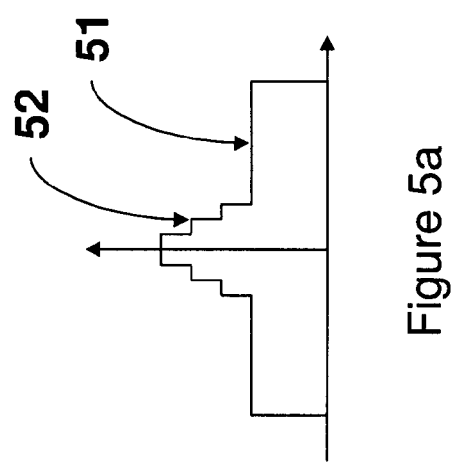
FIG. 5a of the drawings is a schematic cross-sectional representation of the acoustic velocity of an exemplary fiber of the present invention that has more than one cladding acoustic region.

Another embodiment of the present invention has an acoustic profile as shown in FIG. 5a, resembling its optical waveguide analogue known in the art as pedestal fibers. According to this embodiment, the acoustic cladding has more than one acoustic region. The cladding region 51 adjacent to the core, the so-called pedestal region, has an increased acoustic velocity relative to the outer region of the cladding, thereby reducing the acoustic velocity drop from the outer layer of the acoustic core 52. This fiber configuration may be preferred where the selection of dopants used in the core is constrained to meet specific optical parameters. For analytical purposes, the pedestal regions may usually be considered as having infinite radial thickness.

In the examples above we have chosen multiple step profiles to illustrate some preferred embodiments. In an actual process, the transition between different core regions can be smoother. For a skilled person in the art, it is straightforward to make some adjustments to accommodate the practical situations.

Some other embodiments of the present invention may have acoustic profiles as shown in FIG. 5b and FIG. 5c. According to these embodiments, the acoustic cladding has more than one acoustic region, with the cladding region adjacent to the core having depressed acoustic velocity. This fiber configuration may be preferred where the selection of dopants used in the core is constrained to meet specific optical parameters. For analytical purposes, the inner cladding regions may usually be considered as having infinite radial thickness.

Figure 6:
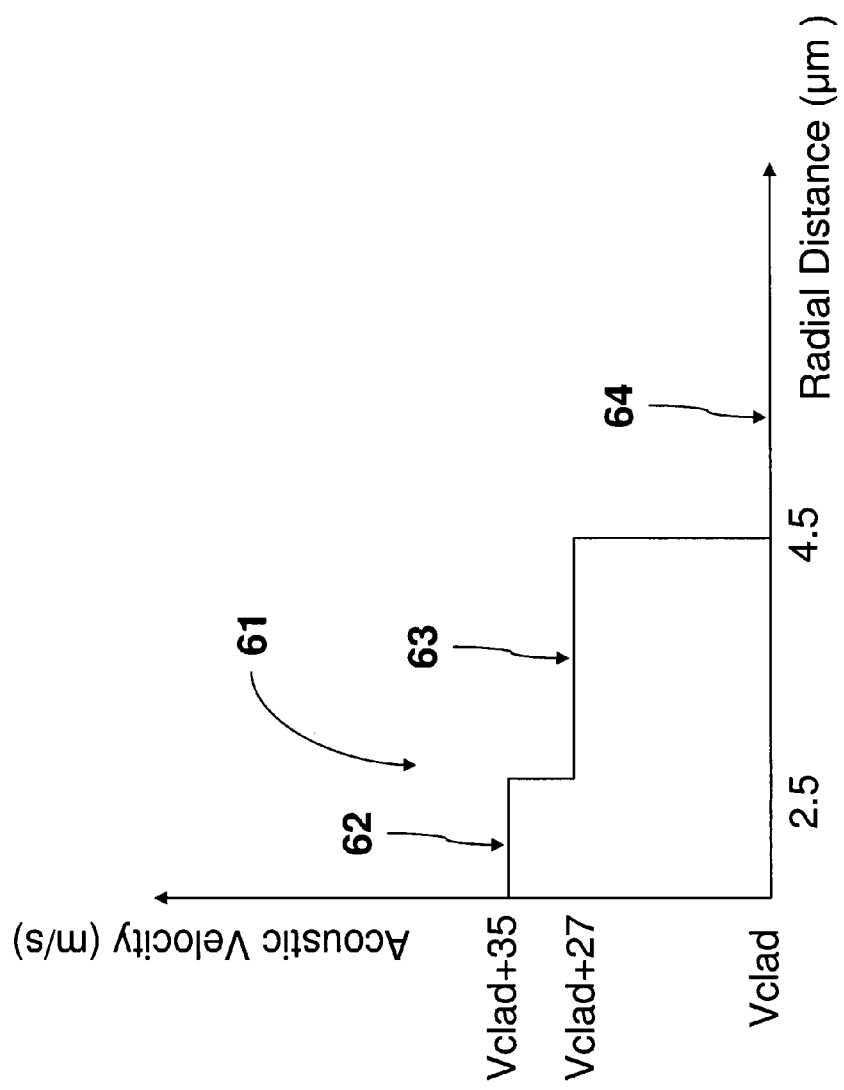
FIG. 6 of the drawings is a schematic cross-sectional representation of the acoustic velocity of an exemplary fiber of the present invention that has two core acoustic regions.

Another embodiment of the present invention with the acoustic profile as shown in FIG. 6 may be more preferably used as a telecommunication fiber. The acoustic core 61 has a diameter of approximately 9 μm and has two acoustic regions. The central region 62 has an acoustic velocity approximately 35 m/s higher than the acoustic velocity in the acoustic cladding 64 (VCLAD), and its radius is approximately 2.5 μm. The outer acoustic region 63 has an acoustic velocity of approximately VCLAD+27 m/s, and the radial thickness of approximately 2 μm. The mode field diameter in this example is approximately 10 μm. For optical wavelengths of approximately 1.55 μm, the SBS threshold would be twice the value of the SBS threshold of typical optical fiber with a similar optical configuration.

Figure 7:
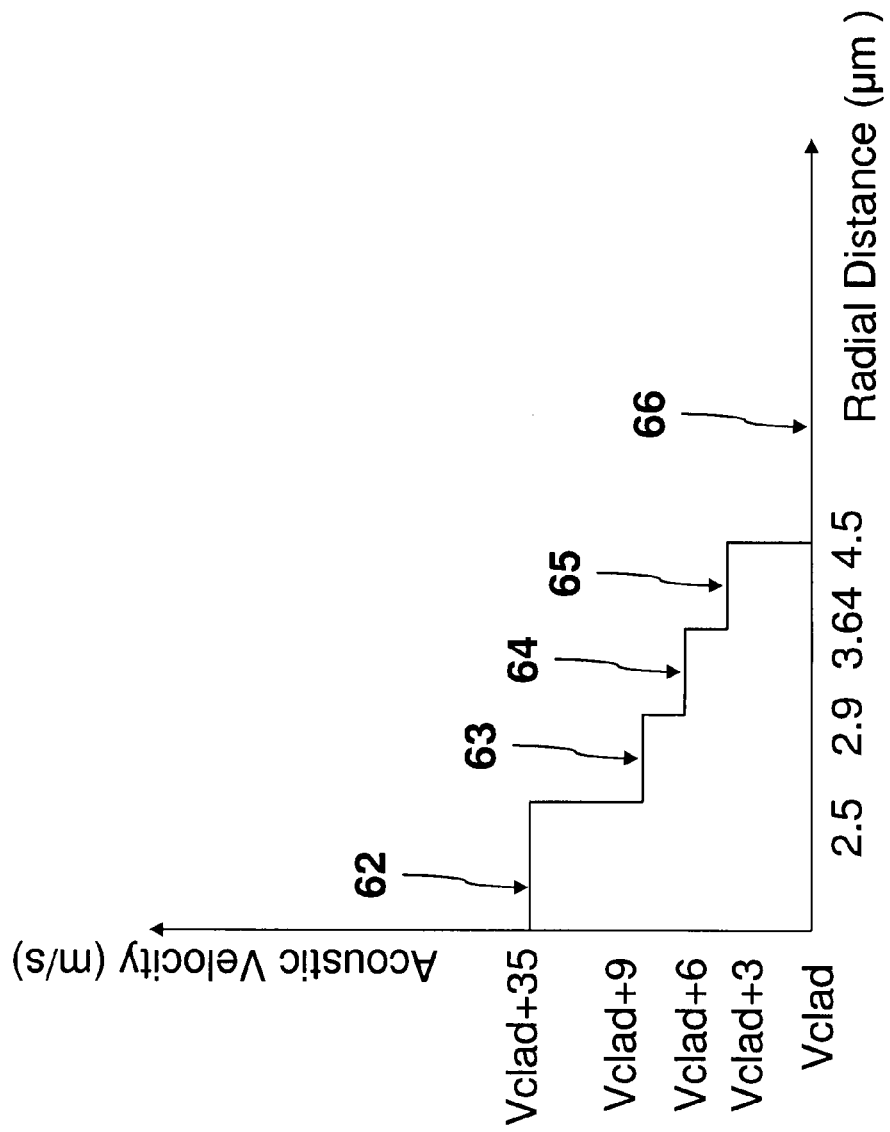

A more preferred embodiment of the present invention has the acoustic profile as shown in FIG. 7. The acoustic core has a diameter of 9 μm and comprises four acoustic regions with acoustic velocities decreasing from the centerline. The central region 62 has a radius of approximately 2.5 μm and an acoustic velocity of approximately VCLAD+35 m/s. The second region from the center 63 has a radial thickness of approximately 0.4 μm, and the acoustic velocity of approximately VCLAD+9 m/s. The third region from the center 64 has a radial thickness of approximately 0.7 μm, and the acoustic velocity of approximately VCLAD+6 m/s. Finally, the fourth region from the center 65 has a radial thickness of approximately 0.9 μm, and an acoustic velocity of approximately VCLAD+3 m/s. The mode field diameter is approximately 10 μm. This configuration would have approximately increased the SBS threshold ten times for optical wavelengths around 1.5 μm.

Figure 8:
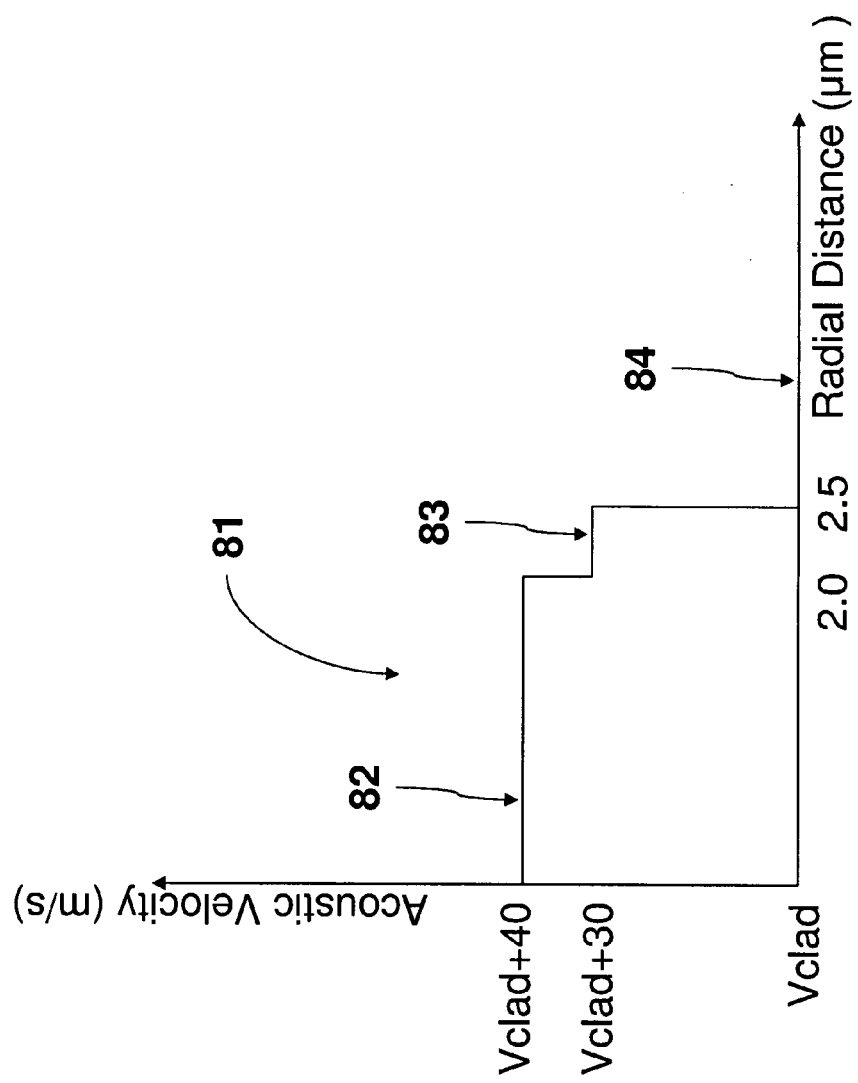
FIGS. 8 and 9 are acoustic profiles for additional exemplary fiber embodiments of the present invention.

Another embodiment of the present invention with the acoustic profile as shown in FIG. 8 may be more preferably used as a component or dispersion-shifted fiber. The acoustic core 81 has a diameter of approximately 5 μm and has two acoustic regions. The central region 82 has an acoustic velocity approximately 40 m/s higher than the acoustic velocity in the acoustic cladding 84 (VCLAD), and its radius is approximately 2 μm. The outer acoustic region 83 has an acoustic velocity of approximately VCLAD+30 m/s, and the radial thickness of approximately 0.5 μm. The mode field diameter in this example is approximately 9 μm. For optical wavelengths of approximately 1.55 μm, the SBS threshold would be approximately several times the value of the SBS threshold of a typical optical fiber with a similar optical configuration.

Figure 9:
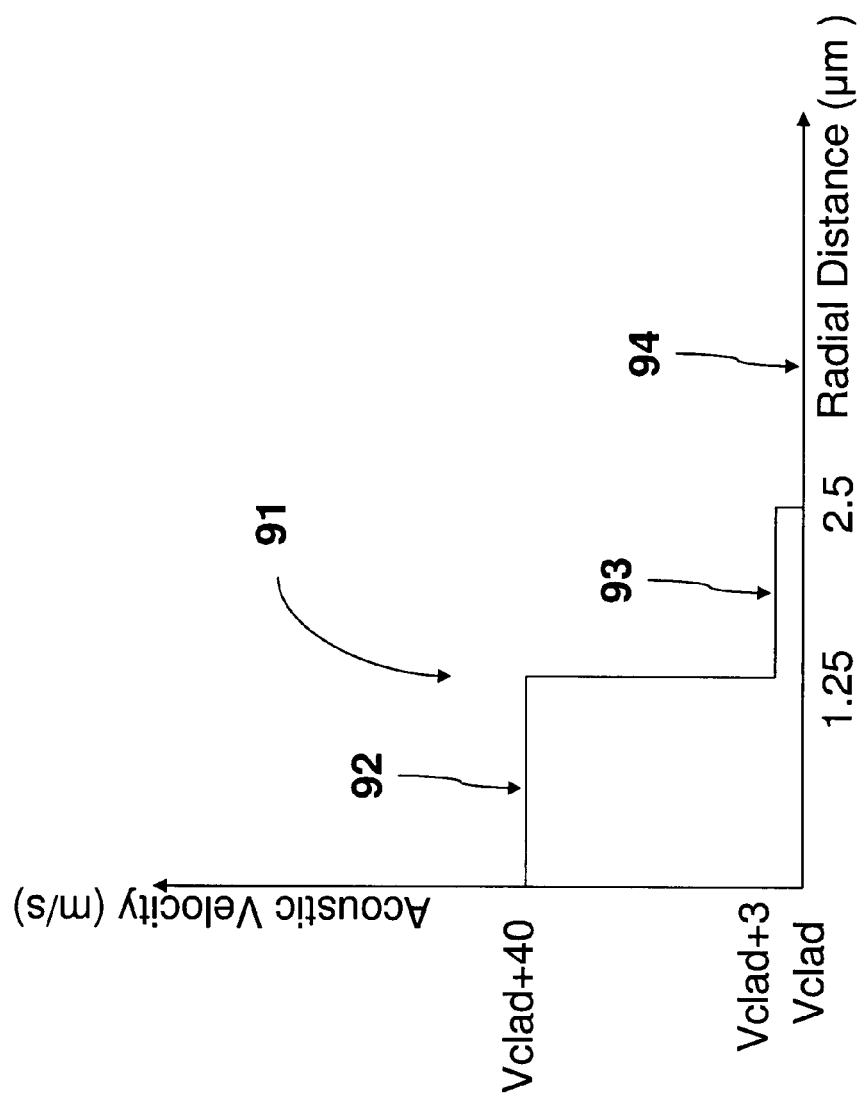

A more preferred embodiment of the present invention has the acoustic profile as shown in FIG. 9. The acoustic core has a diameter of 5 μm and has two acoustic regions. The central region 92 has an acoustic velocity approximately 40 m/s higher than the acoustic velocity in the acoustic cladding 94 (VCLAD), and its radius is approximately 1.25 μm. The outer acoustic region 93 has an acoustic velocity of approximately VCLAD+3 m/s, and a radial thickness of approximately 1 μm. The mode field diameter in this example is approximately 9 μm. For optical wavelengths of approximately 1.55 μm, the SBS threshold would be approximately more than ten times the value of the SBS threshold of a typical optical fiber with the similar optical configuration.

This invention does not require all the advantageous features and all the advantages to be incorporated into every embodiment of the invention.

Although the present invention has been described in considerable detail with reference to certain preferred versions thereof, other versions are possible. Therefore, the spirit and scope of the appended claims should not be limited to the description of the preferred versions contained herein.

The invention claimed is:

1. An optical fiber having an elevated threshold for stimulated Brillouin scattering comprising:
   an acoustic core having a centerline and an acoustic velocity profile, the core acoustic velocity profile including two or more regions, each region having a radial thickness of less than three times operating vacuum optical wavelength, the regions located farther from the centerline having decreasing acoustic velocities, the acoustic velocity profile defining a maximum difference of 0.2% between velocities of any two adjacent regions; and
   an acoustic cladding surrounding and directly adjacent to the acoustic core, said fiber having mode field diameter greater than 12 μm;
   the optical fiber thereby having an increased acoustic loss.

2. The optical fiber according to claim 1, wherein the optical core is doped with at least one of the group consisting of B, F, Ge, P, Al and combinations of the foregoing.

3. The optical fiber according to claim 1, wherein the optical cladding is doped with at least one of the group consisting of B, F, Ge, P, and combinations of the foregoing.

4. The optical fiber according to claim 1, wherein the optical core is doped with a rare earth element of the group consisting of Neodymium, Thulium, Dysprosium, Praseodymium, Holmium, Samarium, Ytterbium, Erbium and combinations of the foregoing.

5. The optical fiber according to claim 1, further including polarization maintaining means.

6. An apparatus, comprising: an optical fiber having a core surrounded by a cladding; the core being formed of a fiber material; first value of acoustic wave loss associated with an intrinsic dampening of the fiber material; second value of loss associated with waveguide properties of the core being no less than 1/10th of the first value of acoustic wave loss associated with the intrinsic dampening of the fiber material.

7. The apparatus according to claim 6, wherein the core is one of a uniform core and a core having at least two acoustic layers having respectively different acoustic velocities with increasing acoustic waveguide loss.

8. The apparatus according to claim 6, wherein the optical fiber is determined by a core cladding model defined by $$\Delta V < (\lambda/R)^2 \times 150 \text{ m/s}$$

where $\Delta V$ represents the acoustic velocity difference between the core and cladding, where $\lambda$ represents the vacuum operating optical wavelength, and where R represents the radius of the acoustic core.

9. The apparatus according to claim 6, wherein the core is one of graded in acoustic velocity and having at least two layers.

10. The apparatus according to claim 6, wherein the optical core is doped with at least one of the group consisting of B, F, Ge, P, Al and combinations of the foregoing.

11. The apparatus according to claim 6, wherein the optical cladding is doped with at least one of the group consisting of B, F, Ge, P, and combinations of the foregoing.

12. The apparatus according to claim 6, wherein the optical core is doped with a rare earth element of the group consisting of: Neodymium, Thulium, Dysprosium, Praseodymium, Holmium, Samarium, Ytterbium, Erbium and combinations of the foregoing.

13. A method of forming an acoustically antiguiding optical fiber comprising the steps of: a) forming an optical fiber having acoustic and optical cores with 5 μm diameter; and b) doping the fiber until VCORE−VCLAD=40 m/s, wherein VCORE is the acoustic velocity of the core and VCLAD is the acoustic velocity of the cladding, and wherein the SBS threshold is increased by approximately 25%.

14. A method as set forth in claim 13, further comprising the step of adding an outer core region having an acoustic velocity of 20 m/s above that of the cladding.

* * * * *